US009925728B2

(12) United States Patent
Martin et al.

(10) Patent No.: US 9,925,728 B2
(45) Date of Patent: Mar. 27, 2018

(54) METHOD OF MAKING FIRE RESISTANT SUSTAINABLE AIRCRAFT INTERIOR PANELS

(71) Applicant: THE BOEING COMPANY, Chicago, IL (US)

(72) Inventors: Pedro P. Martin, Madrid (ES); Ana Gonzalez-Garcia, Madrid (ES); Nieves Lapena, Madrid (ES)

(73) Assignee: The Boeing Company, Chicago, IL (US)

(*) Notice: Subject to any disclaimer, the term of this patent is extended or adjusted under 35 U.S.C. 154(b) by 227 days.

(21) Appl. No.: 14/591,875

(22) Filed: Jan. 7, 2015

(65) Prior Publication Data

US 2015/0190973 A1 Jul. 9, 2015

(30) Foreign Application Priority Data

Jan. 8, 2014 (EP) .................................... 14382003

(51) Int. Cl.
*B29C 70/30* (2006.01)
*B29C 70/34* (2006.01)
(Continued)

(52) U.S. Cl.
CPC .............. *B29C 70/30* (2013.01); *B28B 19/00* (2013.01); *B28B 23/0006* (2013.01);
(Continued)

(58) Field of Classification Search
CPC ... B29L 2031/3076; B64C 1/066; B64C 1/18; B64C 2001/0072; B32B 2605/18;
(Continued)

(56) References Cited

U.S. PATENT DOCUMENTS

| | | | |
|---|---|---|---|
| 98,960 | A | 1/1870 | Harrison |
| 148,412 | A | 3/1874 | Cathcart |

(Continued)

FOREIGN PATENT DOCUMENTS

| | | |
|---|---|---|
| DE | 1694556 | 7/1971 |
| DE | 4226988 | 2/1994 |

(Continued)

OTHER PUBLICATIONS

John, Maya Jacob et al. Bio-Based Structural Composite Materials for Aerospace Applications. 2nd SAIAS Symposium, Sep. 14-16, 2008, Stellenbosch, South Africa.*

(Continued)

*Primary Examiner* — Carson Gross
(74) *Attorney, Agent, or Firm* — Haynes and Boone, LLP

(57) ABSTRACT

The present invention relates to method of manufacturing an aircraft interior panel comprising a core sandwiched between first and second skins, wherein both of the first and second skins are formed from natural fibers containing non-halogenated fire-retardant and set within an inorganic thermoset resin, thereby forming a fire-resistant sustainable aircraft interior panel. The method comprises impregnating the natural fibers with non-halogenated fire retardant and an inorganic thermoset resin, and laying up the resin-impregnated natural fibers to sandwich the core. This stack is then cured by raising the temperature of the stack sufficient to initiate curing but without reaching the boiling point of water in the stack, holding the stack at that first temperature before raising the temperature again to reach the boiling point of water in the stack, before cooling the stack.

20 Claims, 4 Drawing Sheets

(51) Int. Cl.

| | |
|---|---|
| ***B28B 19/00*** | (2006.01) |
| ***B28B 23/00*** | (2006.01) |
| ***C04B 28/00*** | (2006.01) |
| ***C04B 30/02*** | (2006.01) |
| *B29L 31/30* | (2006.01) |
| *B64C 1/06* | (2006.01) |
| *C04B 111/00* | (2006.01) |
| *C04B 111/28* | (2006.01) |

(52) U.S. Cl.
CPC .............. *B29C 70/34* (2013.01); *C04B 28/00* (2013.01); *C04B 28/005* (2013.01); *C04B 30/02* (2013.01); *B29L 2031/3076* (2013.01); *B32B 2309/025* (2013.01); *B64C 1/066* (2013.01); *C04B 2111/0062* (2013.01); *C04B 2111/00896* (2013.01); *C04B 2111/00982* (2013.01); *C04B 2111/28* (2013.01); *Y02W 30/97* (2015.05); *Y10T 156/10* (2015.01)

(58) Field of Classification Search
CPC .......... B32B 3/12; B32B 37/146; B32B 21/10; B32B 2305/022; B32B 2305/024; B32B 2305/076; B32B 2305/18; B32B 2305/188; B32B 2305/20; B32B 2305/22; B32B 2305/28; B32B 2317/10; C04B 2111/00982; C04B 2111/00896; C04B 14/041; B29C 66/739; B29C 66/7394; B29C 66/73941
See application file for complete search history.

(56) References Cited

U.S. PATENT DOCUMENTS

| | | | | |
|---|---|---|---|---|
| 251,640 | A | 12/1881 | Root | |
| 3,802,141 | A | 4/1974 | Hayes | |
| 4,360,553 | A | 11/1982 | Landheer | |
| 4,917,747 | A | 4/1990 | Chin et al. | |
| 5,284,702 | A * | 2/1994 | Umemoto | C08J 5/24 442/149 |
| 5,368,794 | A | 11/1994 | Ou | |
| 5,709,925 | A | 1/1998 | Spengler et al. | |
| 5,948,706 | A | 9/1999 | Riedel et al. | |
| 5,976,646 | A | 11/1999 | Stevens | |
| 6,045,204 | A | 4/2000 | Frazier et al. | |
| 6,073,883 | A | 6/2000 | Ohlmann et al. | |
| 6,121,398 | A | 9/2000 | Wool | |
| 6,419,776 | B1 | 7/2002 | Hoopingamer et al. | |
| 6,679,969 | B1 | 1/2004 | Fournier et al. | |
| 6,802,478 | B2 | 10/2004 | Katori | |
| 6,899,299 | B2 | 5/2005 | Ritts | |
| 6,992,027 | B1 | 1/2006 | Buckingham et al. | |
| 7,146,727 | B2 | 12/2006 | Kistner et al. | |
| 2003/0134928 | A1 | 7/2003 | Sulzbach | |
| 2005/0287383 | A1 | 12/2005 | Taylor et al. | |
| 2006/0046042 | A1 | 3/2006 | Drzal et al. | |
| 2006/0099393 | A1 | 5/2006 | Woodman et al. | |
| 2007/0072979 | A1 | 3/2007 | Moad et al. | |
| 2007/0110976 | A1 | 5/2007 | Pastore et al. | |
| 2007/0190876 | A1 | 8/2007 | Ogawa et al. | |
| 2007/0232176 | A1 | 10/2007 | Cashin et al. | |
| 2008/0073465 | A1 | 3/2008 | Veihelmann et al. | |
| 2009/0069463 | A1 | 3/2009 | Serizawa | |
| 2009/0072086 | A1 | 3/2009 | Smith et al. | |
| 2009/0156073 | A1 | 6/2009 | Schubert | |
| 2010/0125112 | A1 | 5/2010 | Chung et al. | |
| 2010/0317770 | A1 | 12/2010 | Lampinen et al. | |
| 2010/0324192 | A1 | 12/2010 | Costard | |
| 2011/0092622 | A1 | 4/2011 | Kaneda et al. | |
| 2012/0148824 | A1 * | 6/2012 | Martin | B29C 70/342 428/301.4 |
| 2014/0302736 | A1 | 10/2014 | Anandjiwala et al. | |

FOREIGN PATENT DOCUMENTS

| | | | |
|---|---|---|---|
| DE | 29900621 | | 5/1999 |
| DE | 102008059770 | A1 | 6/2010 |
| EP | 0478033 | | 4/1992 |
| EP | 0901964 | | 3/1999 |
| EP | 1493543 | | 1/2005 |
| EP | 1639040 | | 3/2006 |
| EP | 1988118 | | 11/2008 |
| EP | 2047983 | | 4/2009 |
| EP | 2182138 | | 5/2010 |
| EP | 2323854 | | 5/2011 |
| EP | 2436711 | | 4/2012 |
| EP | 2463083 | | 6/2012 |
| EP | 2463083 | A2 | 6/2012 |
| EP | 2644373 | | 10/2013 |
| FR | 2975041 | | 11/2012 |
| FR | 2978375 | | 2/2013 |
| FR | 2988640 | | 10/2013 |
| FR | 2988642 | | 10/2013 |
| JP | S52-065014 | | 5/1977 |
| JP | H07-239197 | | 9/1995 |
| JP | H10-158524 | | 6/1998 |
| JP | 2002-225210 | | 8/2002 |
| JP | 2005-009028 | | 1/2005 |
| JP | 2006-002869 | | 1/2006 |
| JP | 4425910 | | 3/2010 |
| JP | 2010-095943 | | 4/2010 |
| JP | 2010-121131 | | 6/2010 |
| WO | WO02/38381 | | 5/2002 |
| WO | 2005121224 | A1 | 12/2005 |
| WO | WO2006/065995 | | 6/2006 |
| WO | 2006125287 | A1 | 11/2006 |
| WO | WO2009/153934 | | 12/2009 |

OTHER PUBLICATIONS

Extended European Search Report, Patent Application No. 14382003.3-1703, Sep. 4, 2014.

Black, Sara, "Advanced materials for aircraft interiors", CompositesWorld, Nov. 1, 2006, <URL:http://www.compositesworld.com/articles/advanced-materials-for-aircraft-interiors.aspx>, retrieved Jul. 21, 2017, 8 pages.

Bartl et al., "Applications of Renewable Fibrous Materials", Chemical and biochemical engineering quarterly, 2004, pp. 21-28, vol. 18, No. 1, Croatian Society of Chemical Engineers, Zagreb, Croatia.

Herrera-Franco et al., "Mechanical properties of continuous natural fibre-reinforced polymer composites", Composites Part A: Applied Science and Manufacturing, Mar. 2004, pp. 339-345, vol. 35, Issue 3, Elsevier, Amsterdam, Netherlands.

Bledzki et al., "Properties and modification methods for vegetable fibers for natural fiber composites", Journal of Applied Polymer Science, Feb. 22, 1996, pp. 1329-1336, vol. 59, Issue 8, John Wiley & Sons, Inc., Hoboken, NJ.

Bogoeva-Gaceva et al., "Natural Fiber Eco-Composites", Polymer Composites, Feb. 2007, pp. 98-107, vol. 28, Issue 1, Wiley Interscience, Hoboken, NJ.

Saheb et al., "Natural Fiber Polymer Composites: A Review", Advances in Polymer Technology, 1999, pp. 351-363, vol. 18, No. 4, John Wiley and Sons, Inc., Hoboken, NJ.

Joshi et al., "Are natural fiber composites environmentally superior to glass fiber reinforced composites?", Composites Part A: Applied Science and Manufacturing, Mar. 2004, pp. 371-376, vol. 35, Issue 3, Elsevier, Amsterdam, Netherlands.

"Chapter 5: Aircraft Materials", National Materials Advisory Board, 1977, pp. 65-86, vol. 6, Technomic Publishing Co., Inc., Westport, CT.

Sarkos et al., "Laboratory Fire Testing of Cabin Materials Used in Commercial Aircraft", Journal of Aircraft, Feb. 1979, pp. 78-89, vol. 16, No. 2, American Institute of Aeronautics and Astronautics, Inc., Reston, VA.

Kim et al., "Special issue on optimization of aerospace structures", Structural and Multidisciplinary Optimization, Apr. 2, 2008, pp. 1-2, vol. 36, Issue 1, Springer-Verlag, Berlin, Germany.

(56) References Cited

OTHER PUBLICATIONS

Nam et al, 'Effect of urea additive on the thermal decomposition kinetics of flame retardant grelge cotton nonwoven fabric°, Polymer Degradation and Stability, May 2012, pp. 738-746, vol. 97, Issue 5, Elsevier, Amsterdam, Netherlands.

Weil et al., "Flame Retardants in Commercial Use or Development for Textiles", Journal of Fire Sciences, May 2008, pp. 243, 244, 269, 270, vol. 26, Sage Publications, Thousand Oaks, CA.

"Zotek F—High Performance PVDF Foams for Aviation and Aerospace", Zotefoams plc, Nov., 13 2008, <URL:https://web.archive.org/web/20081113104036/http://www.zotefoams.com/downloads/ZOTEK-F_aircraft-En.pdf>, retrieved Dec. 15, 2015, 6 pages.

Anandjiwala et al., "Bio-based structural composite materials for aerospace applications", 2nd South African International Aerospace Symposium, Sep. 14-16, 2008, pp. 1-6, Cape Town, South Africa.

"Industrial Application of Natural Fibre Reinforced Composites", Fiber Reinforced Plastics, Jun. 2009, pp. 31-35, Issue 2 of 2009, Shanghai Science and Technology Research Institute Co., Ltd., Shanghai, China.

Misra et al., "Bio-based Thermoset Resins and Their Composites", ACCE 2002, Sep. 2002, 33 pages, Michigan State University College of Engineering S, East Lansing, MI.

* cited by examiner

METHOD OF MAKING FIRE RESISTANT SUSTAINABLE AIRCRAFT INTERIOR PANELS

CROSS-REFERENCE TO RELATED APPLICATION

This application claims priority to and the benefit of European Patent Application No. EP 14382003.3, filed on Jan. 8, 2014, the entire disclosure of which is expressly incorporated by reference herein.

FIELD

The present invention relates to a method of making fire resistant sustainable aircraft interior panels comprising a sandwich panel structure. The aircraft interior panels may be used in applications like floors, ceilings, sidewalls and stowage bins.

BACKGROUND

Sandwich panels are used in many aircraft interior applications, such as floors, sidewalls, ceilings and stowage compartments. These types of sandwich panels may be used in similar applications in other types of transport vehicles. In addition to providing a finishing function, the sandwich panels need to have adequate weight and thickness and possess certain mechanical properties and have sufficient fire resistance.

Of particular interest to the applicant is the use of sandwich panels in aircraft interiors. Consequently, the following description focuses on the manufacture of novel sustainable, or environmentally friendly, sandwich panels in aircraft interiors. It will be abundantly clear that the present invention may extend to the manufacture of sandwich panels in general. Such general sustainable sandwich panels enjoy far greater applicability than just aircraft interiors and would not require any modification.

Current aircraft interior panels are sandwich structures comprising a core sandwiched between outer skins. The materials used in these panels are chosen primarily for their fire resistant properties. For commercial airliners, there are strict regulations governing the fire resistant properties of the materials used in the cabin, along with limits as to the heat and smoke released during combustion of such materials. This has led to the widespread use of glass fibre-reinforced composites based on phenolic resins in conventional aircraft interior parts. In addition to their appropriate fire resistance, the panels based on these composite materials may be moulded into complex shapes, they have a high strength-to-weight ratio, appropriate flexural strength and impact resistance, have low maintenance costs and are generally easily installed.

In general, phenolic resins and glass fibre pre-pregs comprise the outer skins of such panels. Alternatively, skins may be made from a composite of glass fibre with epoxy or carbon fibre with epoxy. All these skin materials have known environmental limitations. Phenolic resins are regarded as highly noxious and can cause skin problems, such as dermatitis. Glass fibres cause irritation of the skin, eyes and upper respiratory system producing skin eruption similar in appearance to poison ivy, pneumoconiosis and silicosis. If ingested, glass fibres can also cause gastrointestinal conditions.

The core of a conventional panel is usually formed from a Nomex® honeycomb that contains aramide fibres. These fibres are a heat-resistant synthetic fibre, but have a known disadvantage in that upon fracturing, they produce small fibrils that are harmful to the lungs and cause skin irritation.

The use of such noxious skin and core materials presents difficulties during manufacturing, while heating the resins and where fibres may be exposed after curing, such that careful handling is required. Personal protective equipment is therefore required during manufacturing such panels. This does not apply once the part is made and installed on the aircraft. However, more significant issues arise at the end of the service life of the aircraft where it is scrapped and parts are disposed of. This is of course true for removal and disposal of interior panels at any stage of the aircraft's life, for example during a refit or conversion process. Moreover, the noxious nature of the materials makes the panels poor candidates for recycling and so often end up being sent for burial at landfill. They do not leach but still constitute harmful residues. This is contrary to the aerospace industries current drive for products that achieve a better environmental performance.

The ideal situation would therefore be that in which the sandwich panels are more environmentally friendly while maintaining an excellent technical performance. For example, sandwich panels that are easier to recycle or dispose would be extremely advantageous. An improvement on conventional sandwich panels has been described in EP-A-2,463,083. This document discloses the use of sustainable materials in sandwich panels, namely a sustainable sandwich panel comprising skins formed from natural fibres set within inorganic thermoset or thermoplastic resins and a core formed from fire resistant balsa wood, a fire resistant paper honeycomb or a fire resistant thermoplastic foam.

The present invention provides an improved method of manufacturing such panels comprising skins formed of natural fibres set within inorganic thermoset resin that sandwich a foam core. The improved method of manufacture leads to very much reduced production times for the panels.

SUMMARY

Against this background and from a first aspect, the present invention resides in a method of manufacturing an aircraft interior panel comprising a core sandwiched between first and second skins. Both of the first and second skins are formed from natural fibres containing non-halogenated fire-retardant and set within an inorganic thermoset resin, thereby forming a fire-resistant sustainable aircraft interior panel.

The method comprises the following steps: (a) impregnating the natural fibres with non-halogenated fire retardant; (b) impregnating the fire-resistant natural fibres with inorganic thermoset resin; (c) laying up the resin-impregnated natural fibres to sandwich the core thereby forming a stack of the core sandwiched between the resin-impregnated natural fibres; and (d) curing the stack to form the fire resistant sustainable aircraft interior panel that comprises the core sandwiched between the first and second skins.

The curing step comprises: (d1) raising the temperature of the stack to a first temperature that is equal to or greater than a minimum activation temperature of the inorganic thermoset resin that initiates the curing reaction and less than the boiling point of water in the stack; (d2) holding the stack at the first temperature; (d3) raising the temperature of the stack to a second temperature that is equal to or greater than the boiling point of water in the stack; and (d4) cooling the stack to reduce the temperature of the stack from the second temperature. The first and second temperatures should be determined by reference to the conditions of the stack. For example, the boiling point of water may not necessarily be 100° C. because the stack is not at atmospheric pressure, for example because a vacuum bag process is being used.

Raising the temperature of the stack in step (d1) merely requires ensuring that the temperature of the stack is at the first temperature. The temperature is preferably raised quickly to the first temperature. For example, the stack may be placed in a mould that has been pre-heated to the first temperature to ensure the stack rapidly reaches the first temperature.

Cooling the stack in step (d4) may comprise actively cooling the stack or passively cooling the stack. For example, active cooling may comprise water cooling, for example water cooling a press within which the stack resides. Passive cooling comprises no longer heating the stack such that it naturally cools back to ambient temperature.

Steps (d2) to (d3) represent a novel curing cycle that has been discovered to provide substantial reductions in the time to form the aircraft interior panels. It may be contrasted to prior art methods, such as that described in our earlier patent application EP-A-2,463,083. A single step curing cycle is described therein that comprises curing at a temperature of 80° C. for 2 hours or more. In contrast, the two-step curing cycle disclosed herein may reduce that curing temperature substantially, for example down to as little as 15 minutes where a pre-heated mould is used.

The natural fibres are protected against fire with an environmentally-friendly flame retardant, such as a non-halogenated flame retardant. This may be achieved in the same way as described in EP-A-2,463,083. This is performed prior to their impregnation with the inorganic thermoset resin.

The method may further comprise, between steps (b) and (c), the further steps of: (b1) storing the resin-impregnated natural fibres as prepregs; and (b2) retrieving from storage the prepregs of resin-impregnated natural fibres. Thus, the invention according to the first aspect of the invention may be practised either by (a) first forming prepregs, then storing the prepregs and only subsequently laying up the prepregs and curing to form the aircraft interior panel, or (b) using a continual process where the resin-impregnated natural fibres are immediately layed up on the core and then cured to form the aircraft interior panel.

The use of prepregs also gives a reduction in the time to form an aircraft interior panel. In particular, the final manufacturing process is markedly reduced as prepregs are conveniently available to be laid up quickly and cured rapidly according to the novel two-step curing cycle.

The present invention also resides in a method of manufacturing an aircraft interior panel comprising a core sandwiched between first and second skins. Both of the first and second skins are formed from natural fibres containing fire-retardant and set within an inorganic thermoset resin, thereby forming a fire-resistant sustainable aircraft interior panel. The method comprises: (a) impregnating the natural fibres with fire retardant; (b) impregnating the fire-resistant natural fibres with inorganic thermoset resin; (b1) storing the resin-impregnated natural fibres as prepregs; (b2) retrieving from storage the prepregs of resin-impregnated natural fibres; (c) laying up the resin-impregnated natural fibres to sandwich the core thereby forming a stack of the core sandwiched between the resin-impregnated natural fibres; and (d) curing the stack to form the fire resistant sustainable aircraft interior panel that comprises the core sandwiched between the first and second skins.

Thus, the present invention also improves on the prior art by making use of a prepreg that may be stored prior to manufacturing the panel. This overcomes limitations of the prior art that used impregnated fibres that must be laid up to the core and cured without delay. The prepreg may be stored for extended periods of time before being used to form an aircraft interior panel. For example, the prepreg may be stored up to 60 days, for example at −20° C., as will be described in more detail below.

Optionally, the curing step comprises: (d1) raising the temperature of the stack to a first temperature that is equal to or greater than a minimum activation temperature of the inorganic thermoset resin that initiates the curing reaction and less than the boiling point of water in the stack; (d2) holding the stack at the first temperature; (d3) raising the temperature of the stack to a second temperature that is equal to or greater than the boiling point of water in the stack; and (d4) cooling the stack to reduce the temperature of the stack from the second temperature.

As above, the first and second temperatures should be determined by reference to the conditions of the stack. For example, the boiling point of water may not necessarily be 100° C. because the stack is not at atmospheric pressure, for example because a vacuum bag process is being used.

As noted above, raising the temperature of the stack in step (d1) merely requires ensuring that the temperature of the stack is at the first temperature. The temperature is preferably raised quickly to the first temperature. For example, the stack may be placed in a mould that has been pre-heated to the first temperature to ensure the stack rapidly reaches the first temperature.

Cooling the stack in step (d4) may comprise actively cooling the stack or passively cooling the stack. For example, active cooling may comprise water cooling, for example water cooling a press within which the stack resides. Passive cooling comprises no longer heating the stack such that it naturally cools back to ambient temperature.

Further optional features will now be described that maybe used in combination with any of the methods described above.

Step (d1) may comprise raising the temperature of the stack to the first temperature wherein the first temperature is between 75° C. and 90° C. and, optionally, is 80° C. or substantially 80° C.

Step (d2) may comprise holding the stack at the first temperature for between 5 minutes and 60 minutes, preferably between 10 and 30 minutes, more preferably between 10 and 20 minutes, and most preferably for 15 minutes or substantially 15 minutes.

Step (d3) may comprise raising the temperature of the stack to the second temperature wherein the second temperature is between 100° C. and 130° C. and, optionally, is 100° C. or substantially 100° C. Step (d3) may comprise raising the temperature of the stack to the second temperature at a rate of between 1° C. per minute and 10° C. per minute, more preferably between 2° C. per minute and 5° C. per minute, and most preferably at 4° C. per minute or substantially 4° C. per minute.

Step (d4) may comprise cooling the stack to reduce the temperature of the stack from the second temperature as soon as the temperature of the stack is measured to have reached the second temperature. Hence, the method may comprise not holding the stack at the second temperature, but only raising the temperature of the stack to the second temperature followed by immediate cooling. Optionally, step (d4) may comprise cooling the stack to allow it to reach ambient temperature.

Optionally, the method may comprise curing the stack in a press. Then steps (c) and (d) may comprise: raising the temperature of dies of the press to the first temperature and holding the dies at the first temperature, then performing step (c) by laying up the stack within the press, closing the press such that the dies sandwich the stack thereby raising the temperature of the stack to the first temperature; and, optionally, cooling the stack to reduce the temperature of the stack by no longer heating the dies and allowing the stack to cool within the press.

Step (b1) may comprise storing the composite prepregs for over 1 day, for example it may comprise storing the composite prepregs for over 7 days, or over 45 days or even for 60 days. Step (b1) may comprise storing the composite prepregs at a temperature below −10° C., optionally at a temperature of −20° C. or substantially −20° C.

Optionally, the method may further comprise passing the resin impregnated natural fibres through drain rollers to achieve a fibre to resin mix ratio between 25% and 50%, preferably between 30% and 35%, and more preferably 33% or substantially 33%.

Step (b) may further comprise impregnating the natural fibres with a resin mix comprising the inorganic thermoset resin in any combination with: a hardener, optionally an aluminium/copper phosphate hardener; and an anti-shrinkage additive, optionally a metakaolin anti-shrinkage additive. Optionally, the resin mix comprises substantially 80% by weight of an aluminium silicate derivative inorganic thermoset resin, substantially 15% by weight of an aluminium/copper phosphate hardener, and substantially 5% by weight of a metakaolin anti-shrinkage additive.

Optionally, the natural fibres comprise flax fibres although other natural fibres like hemp, sisal and jute may be used. The natural fibres may be woven as a fabric, either before or after immersion in flame retardant.

Step (a) may comprise impregnating the natural fibres with a non-halogenated flame retardant.

In any of the above methods, the core may comprise a paper honeycomb or balsa wood, although preferably the core comprises a thermoplastic foam such as a fire resistant thermoplastic foam like a polyvinylidene fluoride foam or a polyetherimide foam. An advantage of using a foam over the conventional honeycomb structure might be enhanced soundproofing. When used in aircraft interiors, this might provide a quieter, more pleasant environment for passengers.

For certain applications, aircraft interior panels may comprise more than three layers. For example, in addition to the core, first skin and second skin, the aircraft interior panel may comprise further skins or further cores, or both further skins and cores, or other layers, for example if weight and thickness are not prohibitive for the application. Thus, any of the above methods may be adapted to make such panels. For example, the resin-impregnated natural fibres may be laid up against more than one core to sandwich the multicore structure. Further skins may be added by laying up resin-impregnated natural fibres to previously cured stacks. The orientation of the fibres between skins may be varied. Other layers may be added to the aircraft panel, for example to include conventional finishes for decorative purposes. These layers may be added by spray-painting, for example using an air gun or by adding decorative films to provide texture and colour.

The present invention also extends to a method of manufacturing an aircraft comprising manufacturing an aircraft interior panel in accordance with any of the methods described above and installing the aircraft interior panel within the aircraft.

DRAWINGS

In order that the present invention may be more readily understood, preferred embodiments will now be described, by way of example only, with reference to the following drawings in which.

DESCRIPTION

Figure 1:
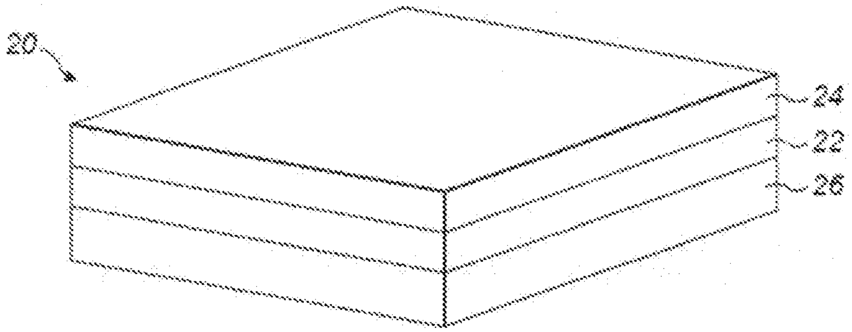
FIG. 1 is a perspective view of a sustainable aircraft interior panel according to a first embodiment of the current invention.

FIG. 1 shows a sustainable aircraft interior panel 20 according to a first embodiment of the present invention. The sustainable aircraft interior panel 20 comprises a core 22 sandwiched between an upper skin 24 and a lower skin 26.

The core 22 is a fire resistant PVDF or PEI thermoplastic foam, typically a few mm thick. In alternative embodiments, the core 22 may comprise fire resistant balsa wood or a fire resistant paper honeycomb. Joined to the core 22 are the corresponding upper and lower outer skins 24, 26. Each skin 24, 26 comprises a natural composite material made from natural fibres (already protected against fire with non-halogenated flame retardants) set within an inorganic thermoset resin. In this embodiment, each skin 24, 26 comprises a single natural fibre fabric set within the resin. The skins 24, 26 are formed by curing the panel 20 such that the resin-impregnated natural fibres bond to the core 22 and form the skins 24, 26.

The present invention is not limited to sustainable aircraft interior panel structures comprising only three layers. More than a single core layer 22 may be included, and more than a single skin layer 24, 26 may be included to any one side of the core 22, if thickness and weight are not prohibitive for the application.

Figure 2:
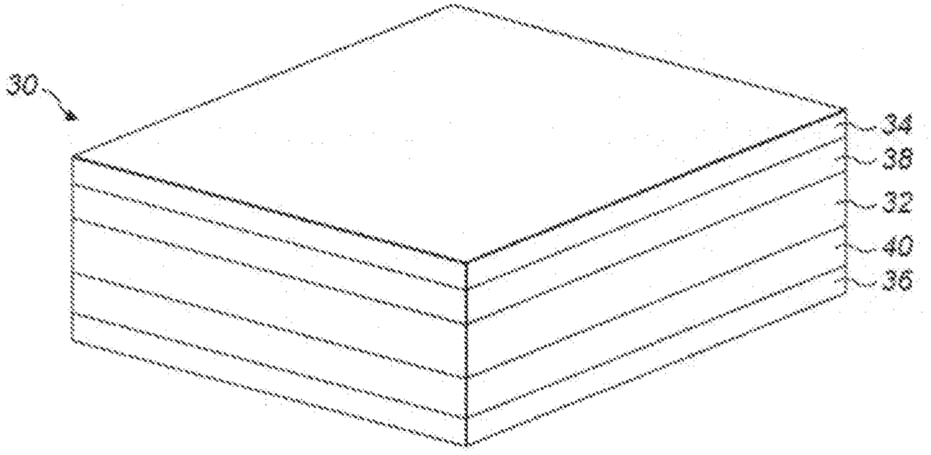
FIG. 2 is a perspective view of a sustainable aircraft interior panel according to a second embodiment of the present invention.

An example of a further sustainable aircraft interior panel 30 is shown in FIG. 2. The sustainable aircraft interior panel 30 comprises five layers that are stacked as follows, from top to bottom: an outer upper skin 34, an inner upper skin 38, a core 32, an inner lower skin 40 and an outer lower skin 36. The core 32 corresponds to the core 22 described in FIG. 1. Also, the skins 34, 36, 38, 40 correspond to the skins 24, 26 described in FIG. 1. Pairs of upper and lower skins 34, 38 and 36, 40 may be provided to increase strength, if thickness and weight are not prohibitive for the application. The skins may be laid up in an aligned manner, or with their plies rotated (e.g., the warp and weft of the outer upper skin 34 may have its warp and weft rotated through 90 degrees relative to those of the inner upper skin 38) to improve their mechanical properties.

Methods of manufacture of fire-resistant sustainable aircraft interior panels according to the present invention will now be described. For the sake of simplicity, three-layer sustainable aircraft interior panels 20 will be described, although it will be readily appreciated that the method may be simply extended to panels having more than three layers.

Figure 3:
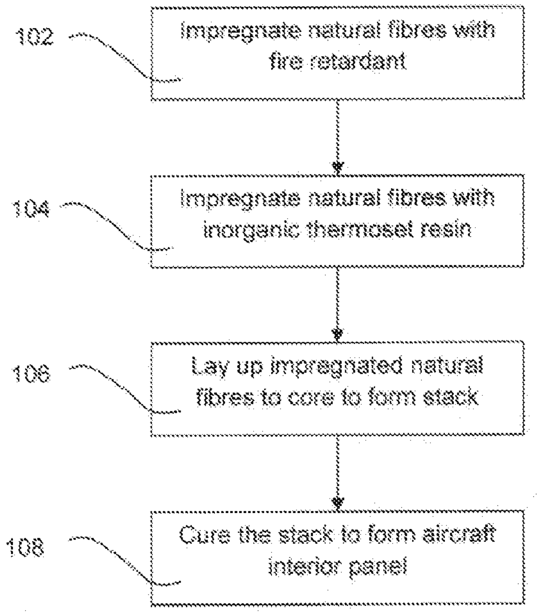
FIG. 3 is a schematic representation showing a method of manufacturing a fire resistant, sustainable aircraft interior panel according to a first embodiment of the present invention.
Figure 4:
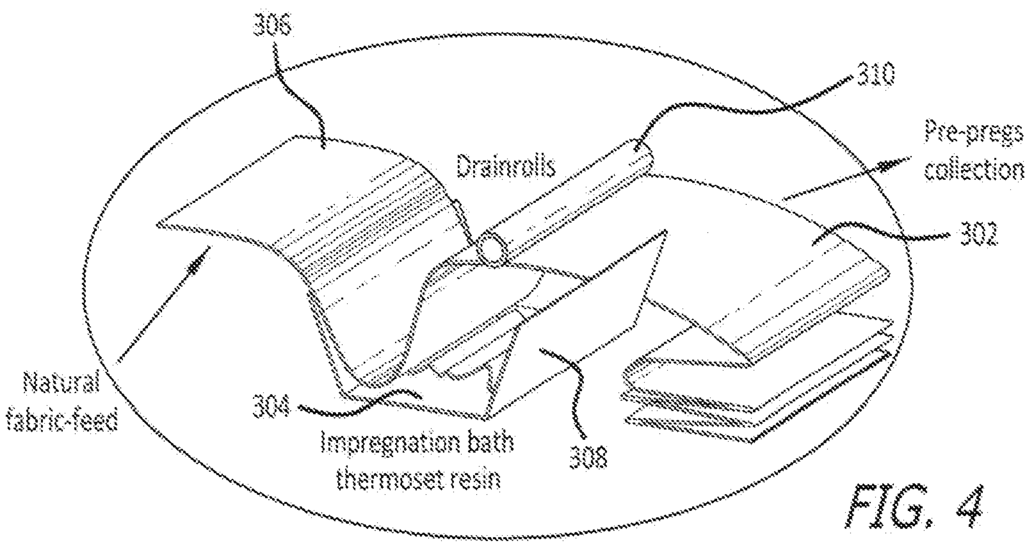
FIG. 4 is a schematic representation of a method of impregnating natural fibres with an inorganic thermoset resin during manufacture of a sustainable aircraft interior panel.

A method of manufacture is shown in FIGS. 3 and 4. At step 102, natural fibre fabrics 306 are immersed in non-halogenated flame retardants to ensure that the fibre fabrics have good fire resistance. In this example, the natural fibres are flax, although other natural fibres like hemp, sisal and jute may be used. At step 104, an inorganic thermoset resin 304 impregnates the fire-resistant natural fibre fabrics 306. As shown in FIG. 4, this is done by feeding the fire resistant natural fibre fabrics 306 through an impregnation bath 308 and then across drain rolls 310. The drain rolls 310 are operated to obtain a desired fabric to resin ratio of 33%.

The impregnation bath 308 contains a resin mix 304 comprising an aluminium silicate derivative used as the inorganic thermoset resin, mixed with a hardener. In this embodiment, aluminium and copper phosphate mixtures are used as the hardener. In addition, an anti-shrinkage additive is used such as metakaolin. The mix in the impregnation bath is 80% wt resin, 15% wt hardener, and 5% wt anti-shrinkage additive.

In this embodiment, the resin impregnated natural fibre fabrics 302 are used immediately to form an aircraft interior panel 20. In alternative embodiments, like that of FIGS. 6 and 7 described below, the resin impregnated natural fibre fabrics 302 are stored as composite prepregs for use later.

At step 106, the resin impregnated natural fibre fabrics 302 are laid up on both sides of the core 22 to form a stack. The resin 304 in the natural fibre fabrics 302 provides adequate adhesion between the skins 24 and 26 and the core 22 as the panel 20 cures. In this embodiment, the core 22 comprises fire resistant PVDF or PEI thermoplastic foam.

At step 108, the complete fire-resistant, sustainable aircraft interior panel 20 is formed by curing the stack in either a vacuum bag or in a hot press. This process is similar to the crush core process, and is now explained in further detail with reference to FIG. 5.

A two-step curing cycle is used. First, at step 152, the temperature of the stack is raised to 80° C. This may be quickly, for example by exposing the stack to a surface pre-heated to this temperature. It will be noted that 80° C. is used as it is sufficiently high to activate the curing reaction, yet is below the boiling point of water. At step 154 the temperature of the stack is held at 80° C. for 15 minutes. This temperature has been found to promote polymerisation of the inorganic thermoset resin 304.

At step 156, the temperature of the stack is raised to 100° C. at a rate of 4° C. per minute. This allows water removal and a complete curing of the inorganic thermoset resin 304. As soon as the temperature of the stack reaches 100° C., the stack is allowed to cool as shown at step 158. In this embodiment, the heat source is switched off such that the stack may cool back to ambient temperature.

Figure 6:
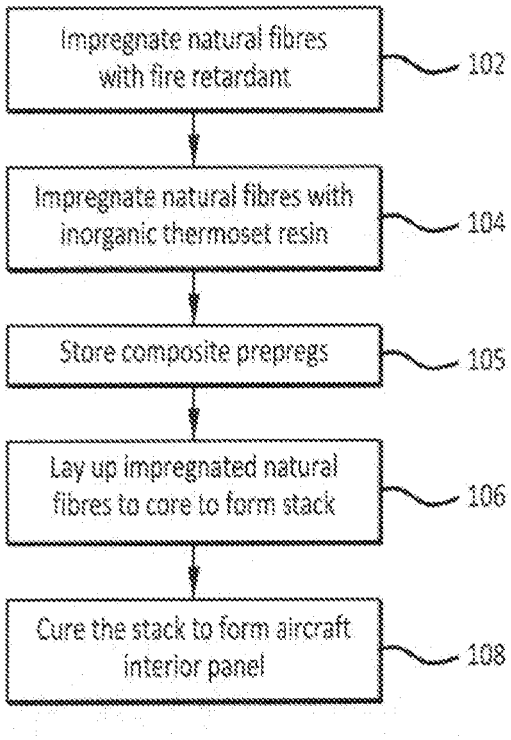
FIG. 6 is a schematic representation showing a method of manufacturing a fire resistant, sustainable aircraft interior panel according to a second embodiment of the present invention.

FIG. 6 shows a further embodiment of a method of manufacture according to the present invention. At steps 102 and 104, the natural fibres are immersed in fire retardant and then immersed in an inorganic thermoset resin as has been described for steps 102 and 104 of FIG. 3. The thus-formed fire-resistant, sustainable prepregs 302 are then stored at step 105. In this embodiment, the prepregs 302 are collected and folded with plastic sheets or by other means such as sili-coated paper in between folds to avoid any resin 304 release from the fire-resistant, sustainable prepregs 302. The folded prepregs 302 are then sealed inside bags and stored at −20° C. for as long as 60 days, and have been found to show no signs of deterioration.

Figure 5:
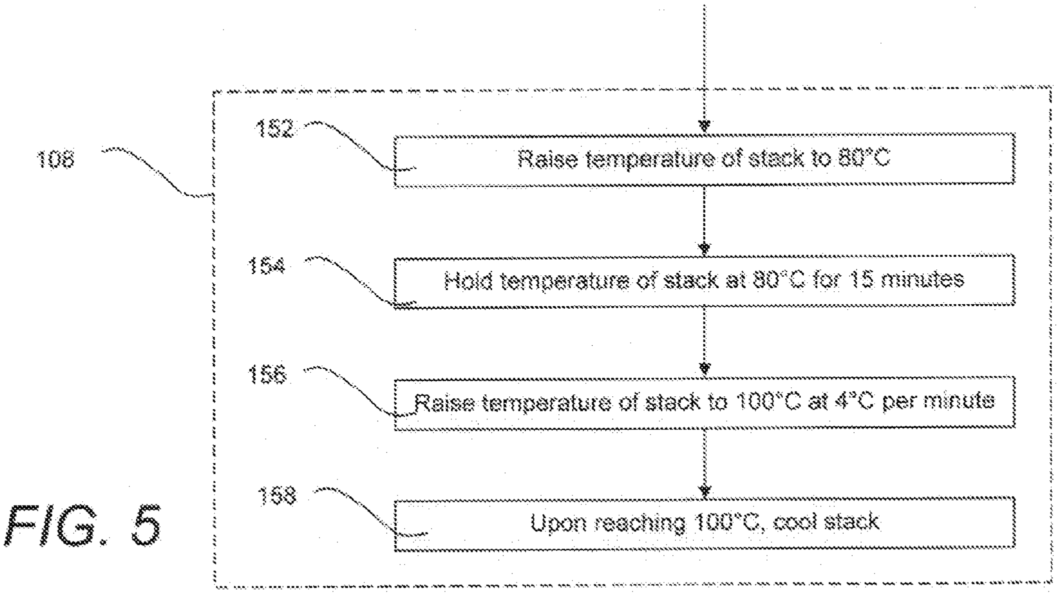
FIG. 5 is a schematic representation of a curing cycle that may be used in the method of FIG. 3 and that may be used in the method of FIG. 6.

When needed, the fire-resistant, sustainable prepregs 302 are retrieved from storage and, at step 106, the sustainable prepregs 302 are laid up on both sides of the core 22 to form the stack. At 108, the complete sandwich panel 20 may be formed by curing in a vacuum bag or a hot press. Step 106 in FIG. 5 is the same as step 106 in FIG. 3. Step 108 may comprise steps 152, 154, 156 and 158 of FIG. 5, although other curing methods may be used, such as those described in our patent application EP-A-2,463,083.

Figure 7:
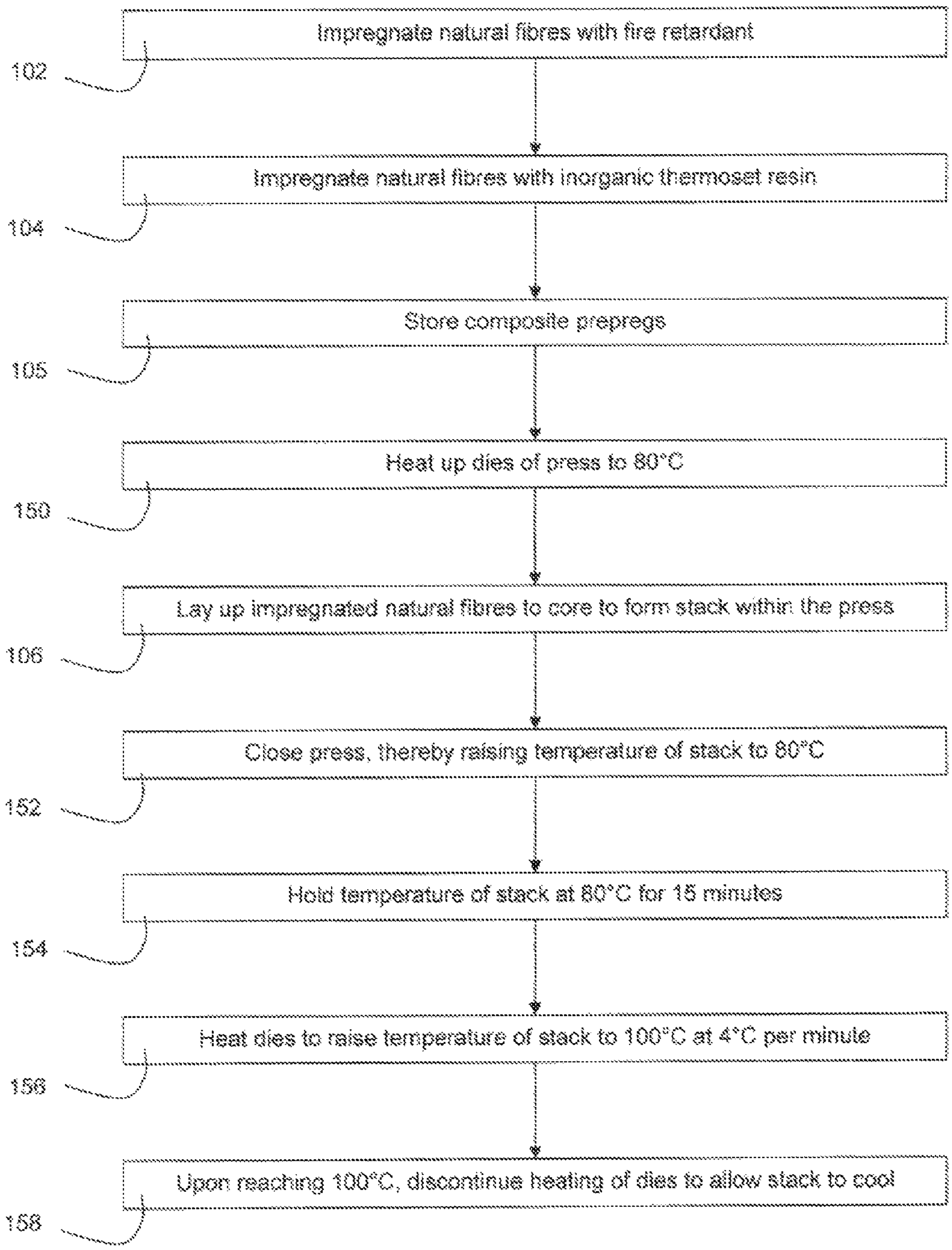
FIG. 7 is a schematic representation showing a method of manufacturing a fire resistant, sustainable aircraft interior panel according to a third embodiment of the present invention.

A further embodiment of a method of manufacturing a fire-resistant, sustainable aircraft interior panel according to the present invention will now be described with reference to FIG. 7. Steps 102, 104 and 105 of FIG. 7 are as already has been described with respect to FIG. 6. Thus, at the end of step 105, pre-pregs of fire-resistant and resin impregnated natural fibre fabrics 302 have been formed and stored.

When needed, the pre-pregs 302 are retrieved from storage. In this embodiment, the curing cycle is performed using a hot press. The hot press comprises a pair of opposed dies. The stack is formed between the dies, such that the dies may be closed. The dies are heated to elevate the temperature of the stack.

At step 150, the dies are heated to a temperature of 80° C. and then held at that temperature. With the dies at 80° C., the method proceeds to step 106 where the stack is formed as previously described with respect to step 106 of FIG. 6. The stack is formed within the press. At step 152, the press is closed such that the dies sandwich the stack. As the stack is in thermal contact with the dies, the temperature of the stack soon rises to 80° C. At step 154, the temperature of the stack is held at 80° C. for 15 minutes by heating the dies appropriately. Either the stack may be held at 80° C. for minutes once the stack reaches 80° C. or, where 15 minutes may be allowed to pass after the press is closed. The latter alternative may be used where the temperature of the stack rises quickly.

After 15 minutes, at step 156, the dies are further raised in temperature such that the temperature of the stack rises, for example at 4° C. per minute. This is maintained until the temperature of the stack is determined to be at 100° C. This may be determined directly by measuring the temperature of the stack, or indirectly by measuring the temperature of the dies. Once a temperature of 100° C. has been reached, heating of the dies is stopped such that the stack begins to cool. The stack is allowed to cool with the press closed. Once the stack has cooled to ambient temperature, the press is opened and the cured fire-resistant, sustainable aircraft interior panel is obtained.

It will be clear to the skilled person that variations may be made to the above embodiments without necessarily departing from the scope of the invention that is defined by the appended claims.

Further, the disclosure comprises embodiments according to the following clauses:

Clause 1. A method of manufacturing an aircraft interior panel comprising a core sandwiched between first and second skins, wherein both of the first and second skins are formed from natural fibres containing fire-retardant and set within an inorganic thermoset resin, thereby forming a fire-resistant sustainable aircraft interior panel, the method comprising:

(a) impregnating the natural fibres with fire retardant to form fire-resistant natural fibres;

(b) impregnating the fire-resistant natural fibres with inorganic thermoset resin;

(c) laying up the resin-impregnated natural fibres to sandwich the core thereby forming a stack of the core sandwiched between the resin-impregnated natural fibres; and (d) curing the stack to form the fire resistant sustainable aircraft interior panel that comprises the core sandwiched between the first and second skins, wherein the curing step comprises:

(d1) raising the temperature of the stack to a first temperature that is equal to or greater than a minimum activation temperature of the inorganic thermoset resin that initiates the curing reaction and less than the boiling point of water in the stack;

(d2) holding the stack at the first temperature;

(d3) raising the temperature of the stack to a second temperature that is equal to or greater than the boiling point of water in the stack; and (d4) cooling the stack to reduce the temperature of the stack from the second temperature.

Clause 2. The method of Clause 1, further comprising between steps (b) and (c):

(b1) storing the resin-impregnated natural fibres as prepregs; and (b2) retrieving from storage the prepregs of resin-impregnated natural fibres.

Clause 3. A method of manufacturing an aircraft interior panel comprising a core sandwiched between first and second skins, wherein both of the first and second skins are formed from natural fibres containing fire-retardant and set within an inorganic thermoset resin, thereby forming a fire-resistant sustainable aircraft interior panel, the method comprising:

(a) impregnating the natural fibres with fire retardant;

(b) impregnating the fire-resistant natural fibres with inorganic thermoset resin;

(b1) storing the resin-impregnated natural fibres as prepregs;

(b2) retrieving from storage the prepregs of resin-impregnated natural fibres;

(c) laying up the resin-impregnated natural fibres to sandwich the core thereby forming a stack of the core sandwiched between the resin-impregnated natural fibres; and (d) curing the stack to form the fire resistant sustainable aircraft interior panel that comprises the core sandwiched between the first and second skins.

Clause 4. The method of Clause 3, wherein the curing step comprises:

(d1) raising the temperature of the stack to a first temperature that is equal to or greater than a minimum activation temperature of the inorganic thermoset resin that initiates the curing reaction and less than the boiling point of water in the stack;

(d2) holding the stack at the first temperature;

(d3) raising the temperature of the stack to a second temperature that is equal to or greater than the boiling point of water in the stack; and (d4) cooling the stack to reduce the temperature of the stack from the second temperature.

Clause 5. The method of Clause 1, wherein step (d1) comprises:

raising the temperature of the stack to the first temperature wherein the first temperature is between 75° C. and 90° C. and, optionally, is substantially 80° C.

Clause 6. The method of Clause 1, wherein step (d2) comprises:

holding the stack at the first temperature for between 5 minutes and 60 minutes, preferably between 10 and 30 minutes, more preferably between 10 and 20 minutes, and most preferably for substantially 15 minutes.

Clause 7. The method Clause 1, wherein step (d3) comprises:

raising the temperature of the stack to the second temperature wherein the second temperature is between 100° C. and 130° C. and, optionally, is substantially 100° C.

Clause 8. The method of Clause 1, wherein step (d3) comprises:

raising the temperature of the stack to the second temperature at a rate of between 1° C. per minute and 10° C. per minute, more preferably between 2° C. per minute and 5° C. per minute, and most preferably substantially 4° C. per minute.

Clause 9. The method of Clause 1, wherein step (d4) comprises:

cooling the stack to reduce the temperature of the stack from the second temperature as soon as the temperature of the stack is measured to have reached the second temperature.

Clause 10. The method of Clause 1, wherein step (d4) comprises:

cooling the stack to allow it to reach ambient temperature.

Clause 11. The method of Clause 1, comprising curing the stack in a press and wherein steps (c) and (d) comprise:

raising the temperature of dies of the press to the first temperature and holding the dies at the first temperature, then performing step (c) by laying up the stack within the press, closing the press such that the dies sandwich the stack thereby raising the temperature of the stack to the first temperature; and, optionally, cooling the stack to reduce the temperature of the stack by no longer heating the dies and allowing the stack to cool within the press.

Clause 12. The method of Clause 2, wherein step (b1) comprises storing the composite prepregs for over 1 day.

Clause 13. The method of Clause 12, wherein step (b1) comprises storing the composite prepregs at a temperature below −10° C., optionally at a temperature of substantially −20° C.

Clause 14. The method of Clause 1, further comprising passing the resin impregnated natural fibres through drain rollers to achieve a fibre to resin mix ratio between 25% and 50%, preferably between 30% and 35%, and more preferably substantially 33%.

Clause 15. The method of Clause 1, wherein step (b) further comprises impregnating the natural fibres with a resin mix comprising the inorganic thermoset resin in any combination with:

a hardener, optionally an aluminium/copper phosphate hardener; and an anti-shrinkage additive, optionally a metakaolin anti-shrinkage additive.

Clause 16. The method of Clause 15, wherein the resin mix comprises substantially 80% by weight of an aluminium silicate derivative inorganic thermoset resin, substantially 15% by weight of an aluminium/copper phosphate hardener, and substantially 5% by weight of a metakaolin anti-shrinkage additive.

Clause 17. The method of Clause 1, wherein the natural fibres comprise flax fibres, optionally woven as a fabric.

Clause 18. The method of Clause 1, wherein step (a) comprises impregnating the natural fibres with a non-halogenated flame retardant.

Clause 19. A method of manufacturing an aircraft comprising:

manufacturing an aircraft interior panel in accordance with claim 1; and installing the aircraft interior panel within the aircraft.

All mentioned documents are incorporated by reference as if herein written. When introducing elements of the present invention or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this invention has been described with respect to specific embodiments, the details of these embodiments are not to be construed as limitations. Different aspects, embodiments and features are defined in detail herein. Each aspect, embodiment or feature so defined may be combined with any other aspect(s), embodiment(s) or feature(s) (preferred, advantageous or otherwise) unless clearly indicated to the contrary.

We claim:

1. A method of manufacturing an aircraft interior panel comprising a core sandwiched between first and second skins, wherein both of the first and the second skins are formed from natural fibres containing a fire-retardant and set within an inorganic thermoset resin, thereby forming a fire-resistant sustainable aircraft interior panel, the method comprising:

(a) impregnating the natural fibres with the fire retardant to form fire-resistant natural fibres;

(b) impregnating the fire-resistant natural fibres with the inorganic thermoset resin to produce resin-impregnated natural fibres;

(c) laying up the resin-impregnated natural fibres to sandwich the core, thereby forming a stack of the core sandwiched between the resin-impregnated natural fibres; and (d) curing the stack to form the fire-resistant sustainable aircraft interior panel that comprises the core sandwiched between the first and the second skins, wherein the curing comprises:

(d1) raising the temperature of the stack to a first temperature that is equal to or greater than a minimum activation temperature of the inorganic thermoset resin that initiates a curing reaction and less than a boiling point of water in the stack;

(d2) holding the stack at the first temperature;

(d3) raising a temperature of the stack to a second temperature that is equal to or greater than the boiling point of water in the stack; and (d4) cooling the stack to reduce a temperature of the stack from the second temperature.

2. The method of claim 1, further comprising between steps (b) and (c):

(b1) storing the resin-impregnated natural fibres as prepregs; and (b2) retrieving from storage the prepregs of the resin-impregnated natural fibres.

3. The method of claim 1, wherein the first temperature is between 75° C. and 90° C.

4. The method of claim 1, wherein step (d2) further comprises:

holding the stack at the first temperature for between 5 minutes and 60 minutes.

5. The method of claim 1, wherein the second temperature is between 100° C. and 130° C.

6. The method of claim 1, wherein step (d3) further comprises:

raising the temperature of the stack to the second temperature at a rate of between 1° C. per minute and 10° C. per minute.

7. The method of claim 1, wherein step (d4) further comprises:

cooling the stack to reduce the temperature of the stack from the second temperature as soon as a temperature of the stack is measured to have reached the second temperature.

8. The method of claim 1, wherein step (d4) further comprises:

cooling the stack to allow it to reach ambient temperature.

9. The method of claim 1, further comprising curing the stack in a press and wherein steps (c) and (d) further comprise:

raising a temperature of dies of the press to the first temperature and holding the dies at the first temperature, then performing step (c) by laying up the stack within the press, closing the press such that the dies sandwich the stack, thereby raising the temperature of the stack to the first temperature; and cooling the stack, to reduce a temperature of the stack, by no longer heating the dies and allowing the stack to cool within the press.

10. The method of claim 2, wherein step (b1) further comprises storing the composite prepregs for over 1 day.

11. The method of claim 10, wherein step (b1) further comprises storing the composite prepregs at a temperature below −10° C.

12. The method of claim 1, further comprising passing the resin-impregnated natural fibres through drain rollers to achieve a fibre to resin mix ratio between 25% and 50%.

13. The method of claim 1, wherein step (b) further comprises impregnating the natural fibres with a resin mix comprising the inorganic thermoset resin in any combination with:

a hardener; and an anti-shrinkage additive.

14. The method of claim 13, wherein the resin mix comprises substantially 80% by weight of an aluminium silicate derivative inorganic thermoset resin, substantially 15% by weight of an aluminium/copper phosphate hardener, and substantially 5% by weight of a metakaolin anti-shrinkage additive.

15. The method of claim 1, wherein the natural fibres comprise flax fibres.

16. The method of claim 1, wherein step (a) further comprises impregnating the natural fibres with a non-halogenated flame retardant.

17. A method of manufacturing an aircraft interior panel comprising a core sandwiched between first and second skins, wherein both of the first and the second skins are formed from natural fibres containing a fire-retardant and set within an inorganic thermoset resin, thereby forming a fire-resistant sustainable aircraft interior panel, the method comprising:

(a) laying up resin-impregnated natural fibres to sandwich the core, thereby forming a stack of the core sandwiched between the resin-impregnated natural fibres; and (b) curing the stack to form the fire-resistant sustainable aircraft interior panel that comprises the core sandwiched between the first and the second skins, wherein the curing comprises:

(b1) raising a temperature of the stack to a first temperature that is equal to or greater than a minimum activation temperature of the inorganic thermoset resin that initiates a curing reaction and less than a boiling point of water in the stack;

(b2) holding the stack at the first temperature;

(b3) raising a temperature of the stack to a second temperature that is equal to or greater than the boiling point of water in the stack; and (b4) cooling the stack to reduce a temperature of the stack from the second temperature.

18. A method of manufacturing an aircraft, the method comprising:

manufacturing an aircraft interior panel comprising a core sandwiched between first and second skins, wherein both of the first and the second skins are formed from natural fibres containing a fire-retardant and set within an inorganic thermoset resin, thereby forming a fire-resistant sustainable aircraft interior panel, the method of manufacturing the aircraft interior panel comprising:

(a) impregnating the natural fibres with the fire retardant to form fire-resistant natural fibres;

(b) impregnating the fire-resistant natural fibres with the inorganic thermoset resin to produce resin-impregnated natural fibres;

(c) laying up the resin-impregnated natural fibres to sandwich the core, thereby forming a stack of the core sandwiched between the resin-impregnated natural fibres; and (d) curing the stack to form the fire-resistant sustainable aircraft interior panel that comprises the core sandwiched between the first and the second skins, wherein the curing comprises:

(d1) raising the temperature of the stack to a first temperature that is equal to or greater than a minimum activation temperature of the inorganic thermoset resin that initiates a curing reaction and less than a boiling point of water in the stack;

(d2) holding the stack at the first temperature;

(d3) raising a temperature of the stack to a second temperature that is equal to or greater than the boiling point of water in the stack; and (d4) cooling the stack to reduce a temperature of the stack from the second temperature; and installing the aircraft interior panel within the aircraft.

19. The method of claim 18, further comprising between steps (b) and (c):

(b1) storing the resin-impregnated natural fibres as prepregs; and (b2) retrieving from storage the prepregs of the resin-impregnated natural fibres.

20. The method of claim 16, wherein the natural fibres comprise flax fibres.

* * * * *